United States Patent
Penner et al.

(10) Patent No.: US 7,370,901 B2
(45) Date of Patent: May 13, 2008

(54) GLOVE BOX ASSEMBLY

(75) Inventors: Benjamin Warren Penner, Ann Arbor, MI (US); Atsushi Kobayashi, Ann Arbor, MI (US); Kerry Scott Zellner, Jr., Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 196 days.

(21) Appl. No.: 11/347,119

(22) Filed: Feb. 3, 2006

(65) Prior Publication Data

US 2007/0182188 A1    Aug. 9, 2007

(51) Int. Cl.
*B60R 7/06* (2006.01)

(52) U.S. Cl. ...................... 296/37.8; 224/483; 292/106

(58) Field of Classification Search ............ 296/24.34, 296/37.8, 37.12; 224/483; 292/106
See application file for complete search history.

(56) References Cited

U.S. PATENT DOCUMENTS

| 530,862 | A | * | 12/1894 | Teed ............................ 292/42 |
| 1,571,453 | A | | 2/1926 | Maxon |
| 3,737,184 | A | | 6/1973 | Swartz |
| 3,756,639 | A | * | 9/1973 | Wilkinson .................. 292/179 |
| 4,547,006 | A | | 10/1985 | Castanier |
| 4,978,152 | A | | 12/1990 | Bisbing |
| 7,036,852 | B2 | * | 5/2006 | Cho ............................ 292/33 |

| 2005/0194795 | A1 | | 9/2005 | Hapke |
| 2007/0018474 | A1 | * | 1/2007 | Jeon ......................... 296/37.8 |

FOREIGN PATENT DOCUMENTS

| FR | 2423608 | | 4/1978 |
| JP | 05338500 | A | 12/1993 |
| JP | 2003013655 | A | 1/2003 |
| JP | 2003148026 | A | 5/2003 |
| JP | 2005009301 | A | 1/2005 |
| JP | 2005104192 | A | 4/2005 |
| WO | WO 9529315 | | 11/1995 |
| WO | WO 0061900 | | 10/2000 |

* cited by examiner

*Primary Examiner*—Dennis H Pedder
(74) *Attorney, Agent, or Firm*—Gifford, Krass, Sprinkle, Anderson & Citkowski, P.C.

(57) ABSTRACT

A glove box assembly for a vehicle includes a box member that is adapted to fit in an opening of the vehicle. The box member includes front and rear surfaces with the rear surface including a guide surface formed thereon. The box member also includes a recessed portion that extends toward the direction of the rear surface defining a storage space. A pair of tabs spaced laterally relative to each other extends downward from the recessed portion and rearward of the guide surface. A slide member extends from a first end to a second end and includes front and rear surfaces. The front surface of the slide member is disposed proximate the guide surface such that the slide member is operative to move laterally relative to the guide surface. The slide member includes a tapered portion that is sized to pass without interference with the pair of tabs when the slide member is positioned in an installation position.

22 Claims, 6 Drawing Sheets

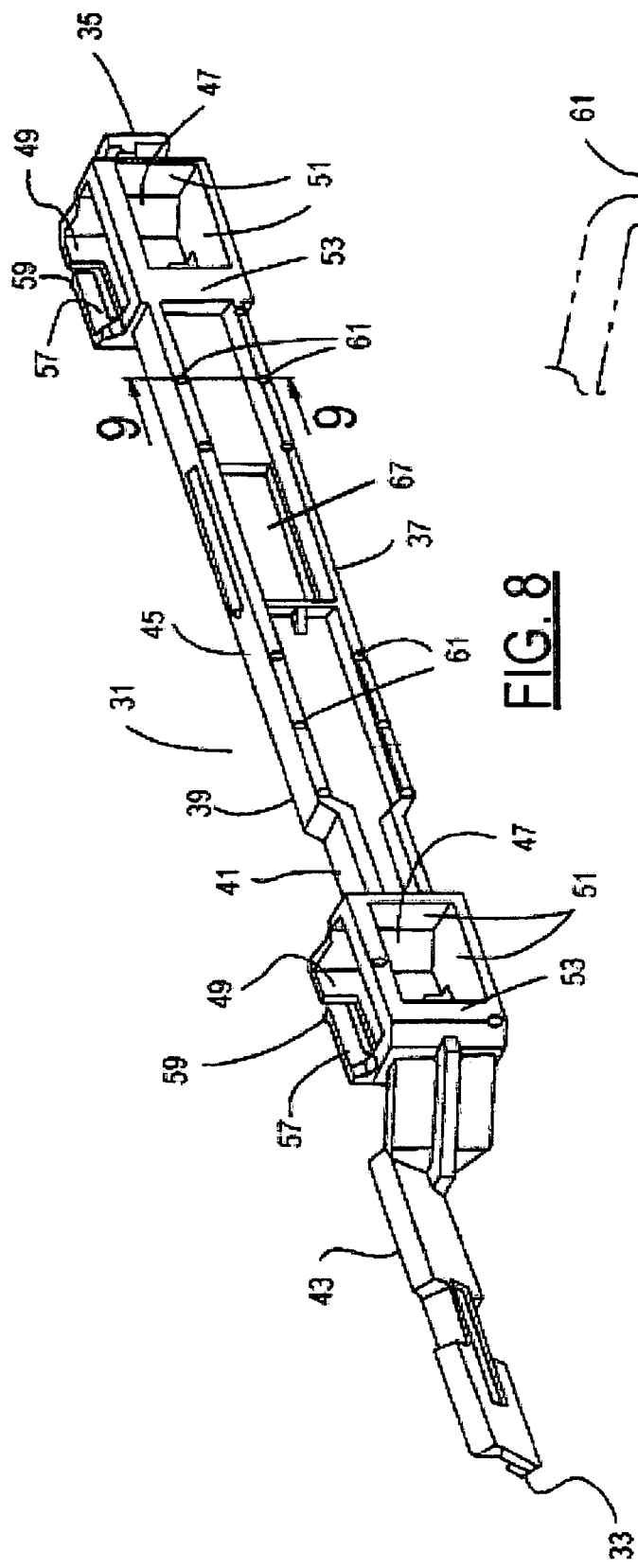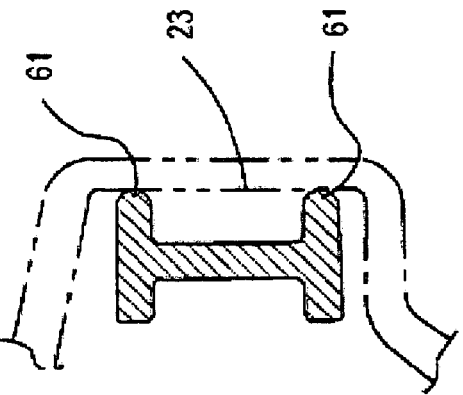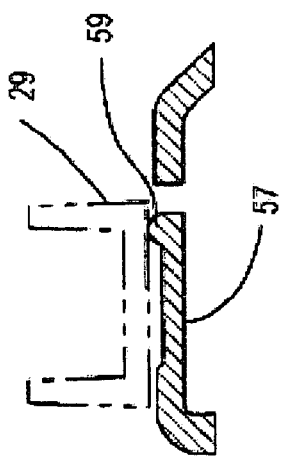
FIG. 8
FIG. 9
FIG. 10

GLOVE BOX ASSEMBLY

FIELD OF THE INVENTION

This invention generally relates to glove box assemblies, and with more particularity to glove box assemblies having a releasable latch mechanism.

BACKGROUND OF THE INVENTION

Glove box assemblies are generally known in the art for use in a vehicle. Such glove box assemblies typically include a compartment having a door that is movable with respect to the compartment. The door generally includes a latch such that the door can be opened and closed by an operator or passenger of a vehicle. Generally such latch mechanisms include a large number of parts making the latch difficult to assemble and costly to manufacture. Additionally, such latch mechanisms are prone to rattle and noise providing a less than desirable effect on a driver or passenger of a vehicle.

Additionally, glove box assemblies positioned in a dash of a vehicle should have a secure latching mechanism to comply with safety requirements. Such a latch should securely retain the door relative to the compartment when a force is applied to the latch.

There is therefore a need in the art for a glove box assembly having a minimum number of parts that is easy to install and manufacture. Additionally, there is also a need in the art for a glove box assembly having a secure latch mechanism that does not rattle or cause unnecessary noise in the vehicle.

SUMMARY OF THE INVENTION

A glove box assembly for a vehicle includes a box member that is adapted to fit in an opening of the vehicle. The box member includes front and rear surfaces with the rear surface including a guide surface formed thereon. The box member also includes a recessed portion that extends toward the direction of the rear surface defining a storage space. A pair of tabs spaced laterally relative to each other extends downward from the recessed portion and rearward of the guide surface. A slide member extends from a first end to a second end and includes front and rear surfaces. The front surface of the slide member is disposed proximate the guide surface such that the slide member is operative to move laterally relative to the guide surface. The slide member includes a tapered portion that is sized to pass without interference with the pair of tabs when the slide member is positioned in an installation position.

BRIEF DESCRIPTION OF THE DRAWINGS

FIG. 8 is a front perspective view of a slide member of the glove box assembly;

FIG. 9 is a sectional view taken along the line 9-9 in FIG. 8;

FIG. 10 is a sectional view taken along the line 10-10 shown in FIG. 1

DETAILED DESCRIPTION OF THE PREFERRED EMBODIMENTS

Figure 1:
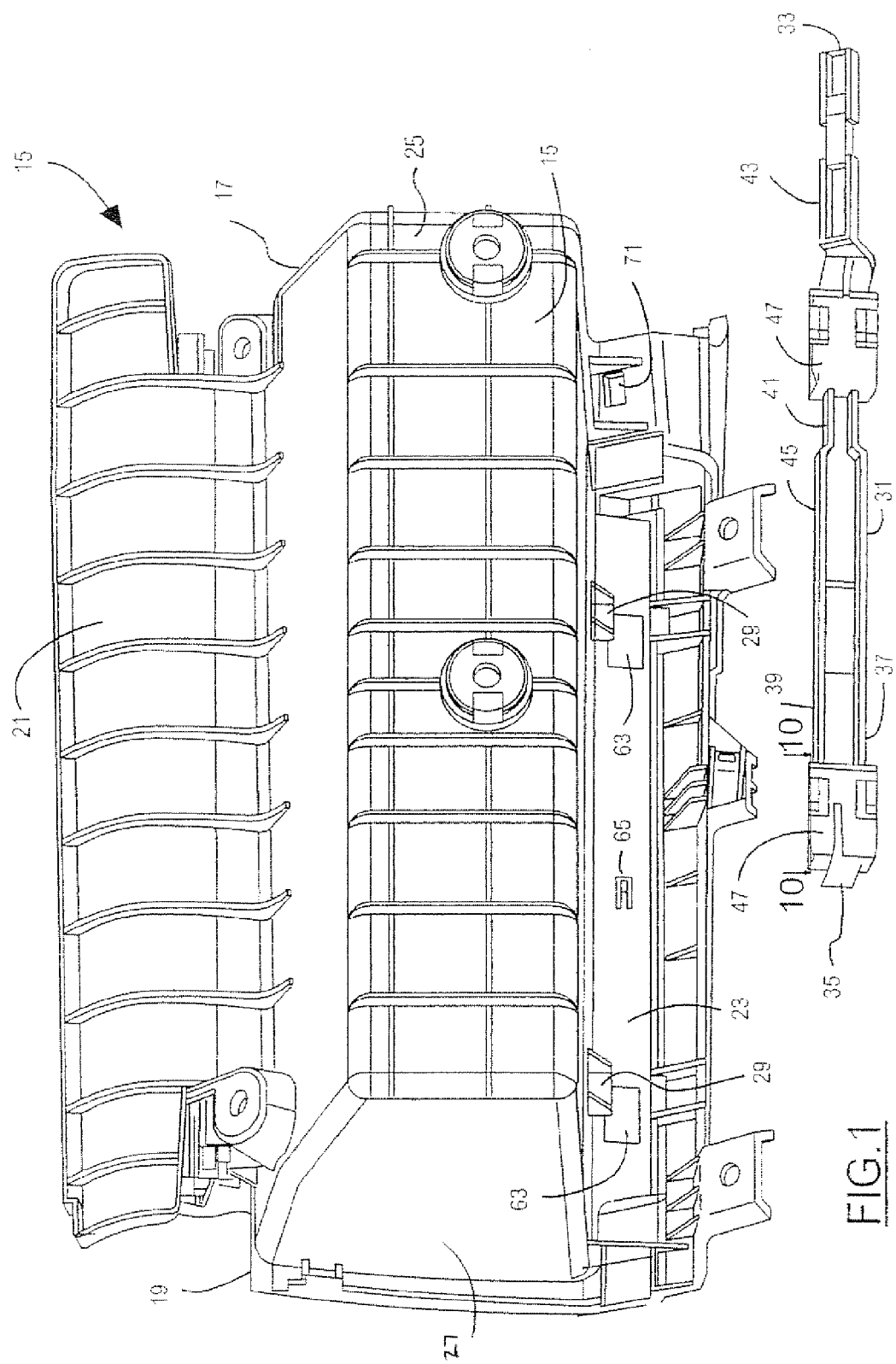
FIG. 1 is a perspective view of a glove box assembly of the present invention.

Referring to FIG. 1, there is shown a glove box assembly 15 according to the present invention. The glove box assembly 15 includes a box member 17 that is adapted to fit in an opening in a vehicle. The opening may be typically formed in an instrument panel but may be moved to other positions within the vehicle as desired. The box member 17 includes front and rear surfaces 19, 21. The rear surface 21 includes a guide surface 23 formed thereon. The box member 17 also includes a recessed portion 25 that extends toward the direction of the rear surface 21 and defines a storage space 27 of the glove box assembly 15. A pair of tabs 29 are spaced laterally relative to each other and extend downward from the recessed portion 25 and rearward of the guide surface 23.

The glove box assembly 15 also includes a slide member 31 that extends from a first end 33 to a second end 35 and includes front and rear surfaces 37, 39. The front surface 37 of the slide member 31 is disposed proximate the guide surface 23 such that the slide member 31 is operative to move laterally relative to the guide surface 23. In one aspect of the invention, the slide member 31 includes a tapered portion 41 that is sized to pass without interference with the pair of tabs 29 when the slide member 31 is positioned in an installation position.

Referring to FIGS. 1 and 8, the slide member 31 includes a release portion 43 formed on the first end 33 and extends toward the second end 35 of the slide member 31. An engagement portion 45 extends from the release portion 43 to the second end 35 of the release member 31. The engagement portion 45 includes a pair of pockets 47 formed therein. The pockets 47 include a rear surface 49 and side surfaces 51 extending forward from the rear surface 49. An engagement ledge 53 extends laterally from one of the side surfaces 51. The engagement ledge 53 is operative to releasably engage a latch member 55 in response to lateral movement of the slide member 31. The pockets 47 also include flexible fingers 57 formed on the rear surface 49 of the pockets 47. The flexible fingers 57 extend laterally relative to the rear surface 49 and terminate at bulbous ends 59 extending rearward. The front surface 37 of the slide member 31 includes rounded projections 61 formed thereon and extend forward from the front surface 37. The combination of the flexible fingers 57 and rounded projections 61 allows the slide member 31 to contact the guide surface 23 of the box member 17 securely such that noise and rattles are eliminated, as will be discussed in more detail below.

Figure 6:
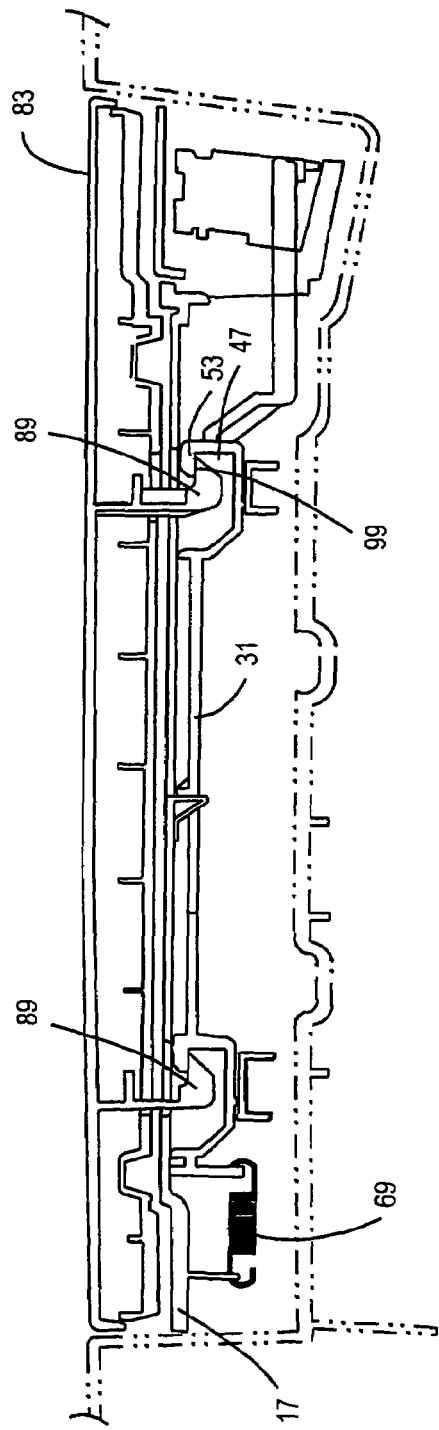
FIG. 6 is a sectional view detailing the glove box assembly in a locked position.
Figure 7:
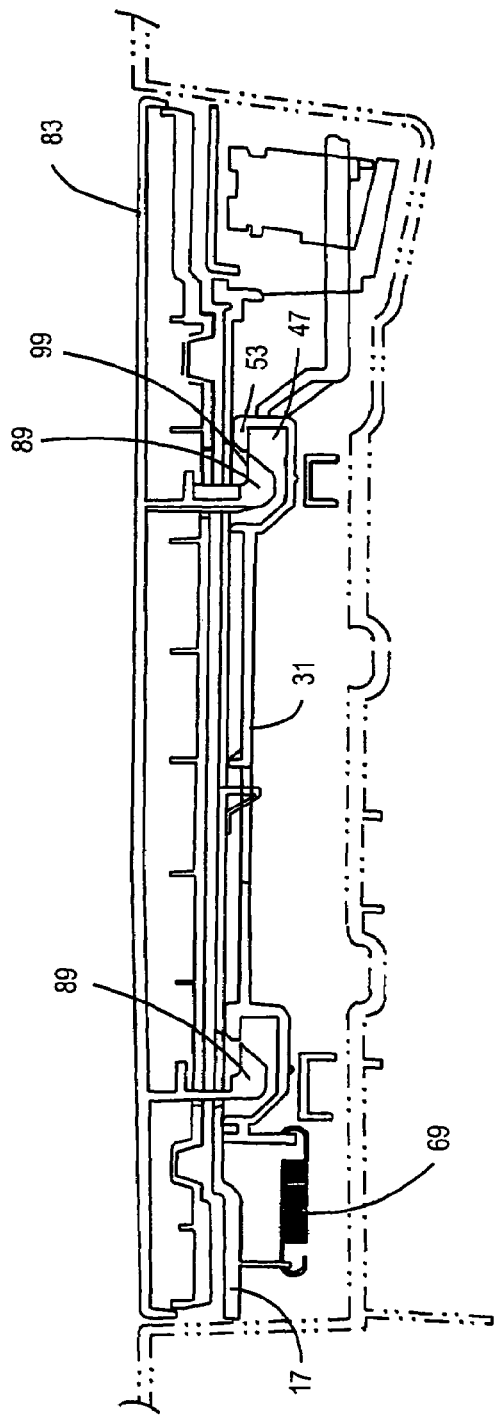
FIG. 7 is a sectional view detailing the glove box assembly in an unlocked position.

The guide surface 23 of the box member 17 includes latch slots 63 formed therein allowing passage of the latch members 55 into the pair of pockets 47. Additionally, the guide surface 23 includes a projection member 65 formed thereon. The projection member 65 is received in a recess 67 formed in the slide member 31, best seen in FIG. 8, that limits the lateral travel of the slide member 31 relative to the guide surface 23. A return spring 69, best seen in FIGS. 6 and 7, is attached to the second end 35 of the slide member 31 at one end of the spring and to the box member 17 at another end of the spring to bias the slide member 31 laterally in a desired direction. The biasing spring 69 allows for the slide member 31 to be biased in a direction such that the latch members 55 are securely retained within the pockets 47, again as will be discussed in more detail below.

As described above, the slide member 31 includes a tapered portion 41 allowing the slide member 31 to be installed without interference from the tabs 29. Referring to FIG. 1, it can be seen that in the installation position, the tapered portion 41 may be positioned directly below the tab 29 on the right-hand side of the box member 17, such that the slide member 31 is positioned proximate the guide surface 23. Next, the slide member 31 may be moved laterally to the left, such that it is in the installed position. In the installed position, the tabs 29 retain the slide member 31 in position proximate the guide surface 23. When in the installed position, the bulbous ends 59 of the flexible fingers 57 contact the pair of tabs 29 biasing the slide member 31 forward as best shown in FIG. 10 such that the rounded projections 61 contact the guide surface 23 as best shown in FIG. 9, again for reducing noise, vibration and rattle between the slide member 31 and the box member 17.

The box member 17 of the present invention also includes a lock slot 71 formed in the box member 17 proximate the release portion 43 of the slide member 31 when the slide member 31 is in the installed position relative to the box member.

Figure 4:
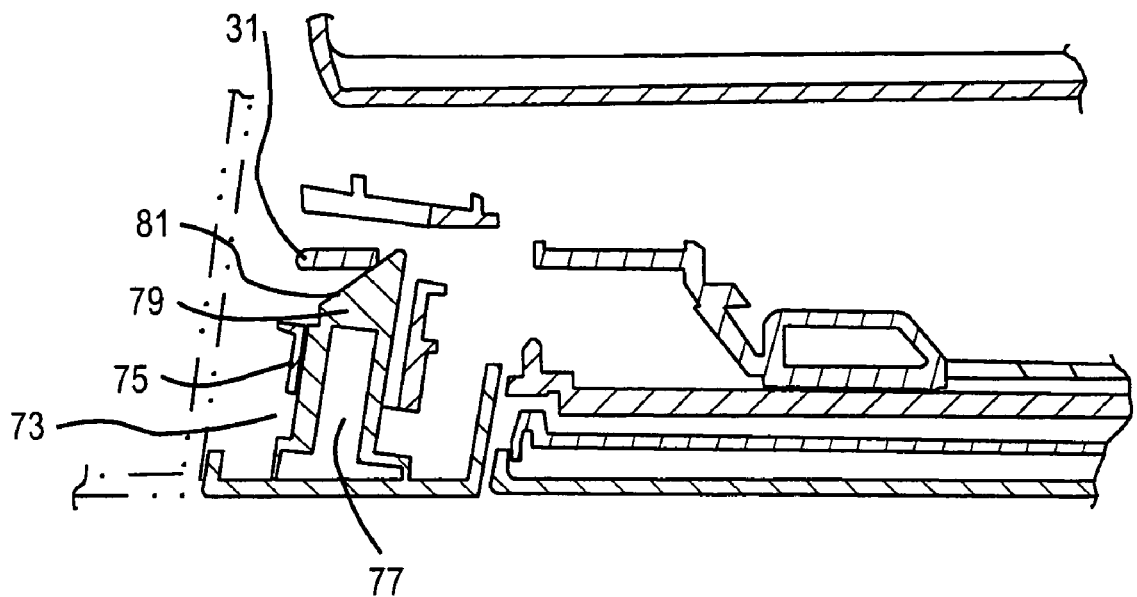
FIG. 4 is a partial sectional view detailing a lock assembly associated with the glove box assembly with the slide member in the locked position.
Figure 5:
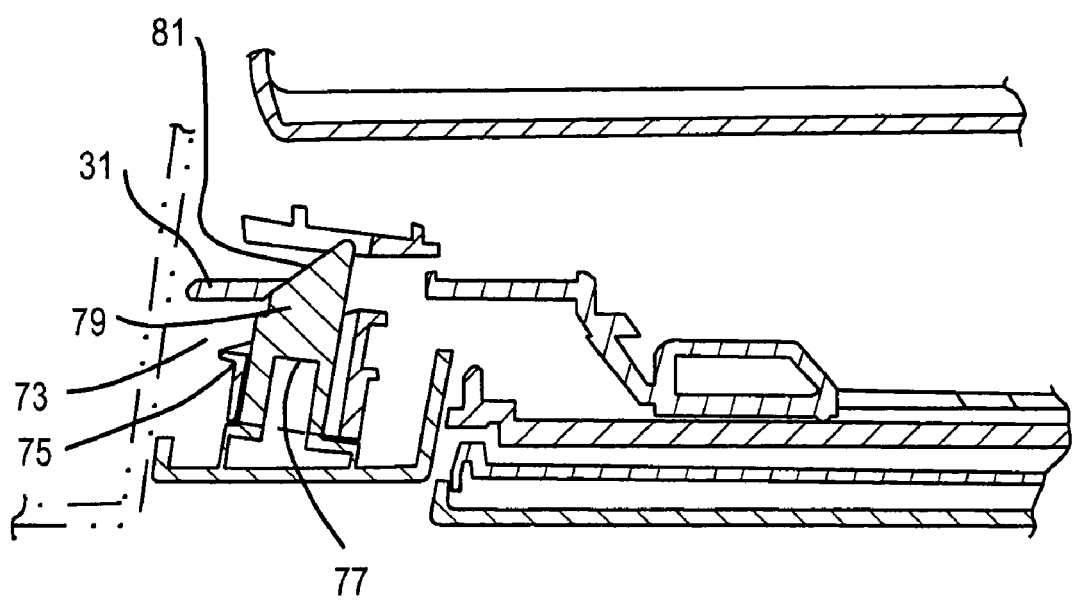
FIG. 5 is a partial sectional view of a lock assembly associated with the glove box assembly with the slide member in the unlocked position.

A lock assembly 73, best seen in FIGS. 4 and 5, including a housing 75 and a lock member 77 movably disposed in the housing 75 for in and out movement relative to the housing 75 is positioned relative to the lock slot 71 formed in the box member 17. The lock member 77 includes an extension portion 79 that passes through the lock slot 71 formed in the box member 17. In one aspect of the invention, a biasing spring may be associated with the lock member 77 and the housing 75 to bias the lock member 77 out relative to the housing 75. The extension portion 79 of the lock member 77 includes an angled surface 81 formed on the end of the extension portion 79. The angled surface 81 is operative to contact the release portion 43 of the slide member 31 to translate in and out motion of the lock member 77 to lateral movement of the slide member 31, to lock and unlock the glove box assembly 15 of the present invention.

Figure 2:
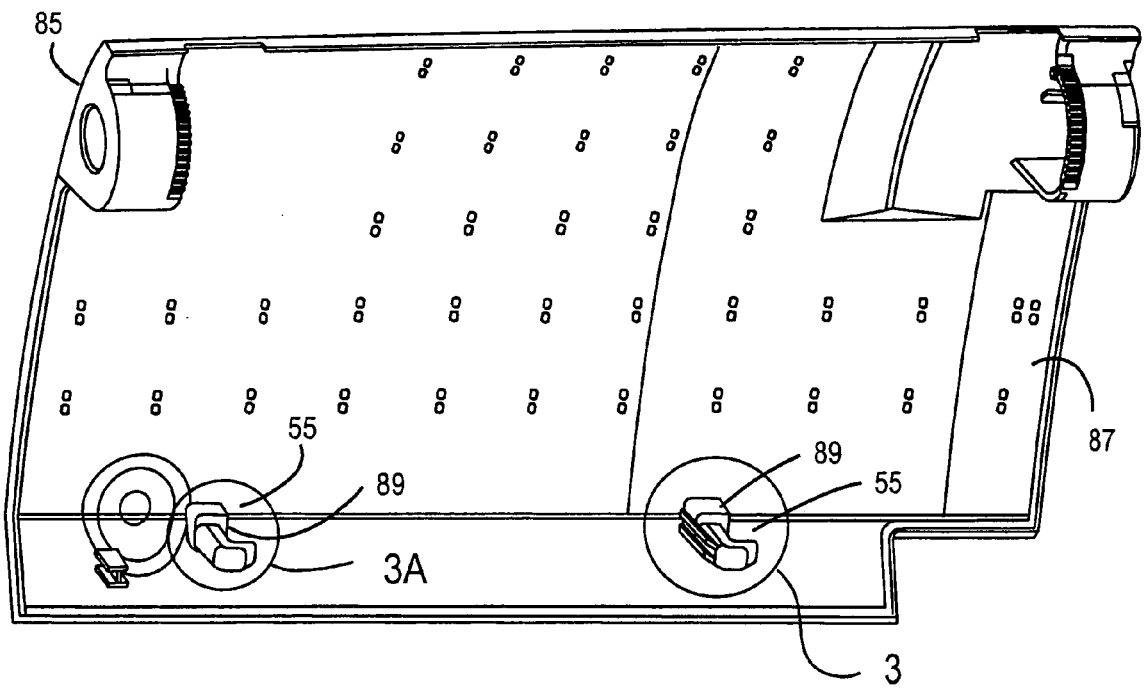
FIG. 2 is a perspective view of a door member of the glove box assembly of the present invention.

Referring to FIG. 2, the glove box assembly 15 of the present invention also includes a door member 83 that is hingedly attached to the box member 17. The door member 83 includes front and rear surfaces 85, 87. At least one latch member 55 extends rearward from the rear surface 87 of the door member 83. The at least one latch member 55, with two being shown in the figures, is movable in and out of the at least one latch slot 63 formed in the box member 17. The at least one latch member 55 is operative to releasably contact the at least one pocket 47 when the door member 83 is hinged closed relative to the box member 17. As stated above, in one aspect of the invention, the at least one latch member 55 includes two latch members 55 that are spaced laterally from each other.

Figure 3:
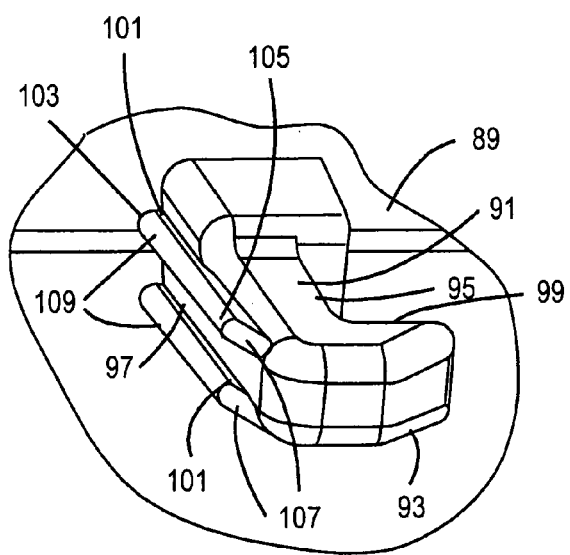
FIG. 3 is a partial view of a latch hook having a datum of the door member shown in FIG. 2.
Figure 3A:
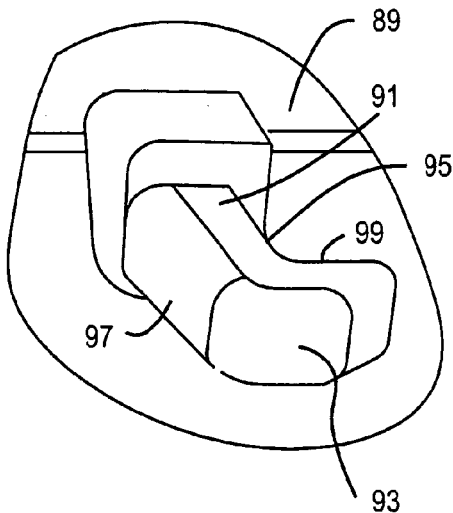
FIG. 3A is a partial view of a latch hook having no datum of the door member shown in FIG. 2.

As shown in FIG. 2, the latch member 55 has a hook member 89 having a shank portion 91 extending from the rear surface 87 of the door member 83 and terminating at a curved portion 93. Both the shank portion 91 and curved portion 93 include inner and outer surfaces 95, 97. The inner surface 95 of the curved portion 93 includes a flat contact portion 99 formed thereon that is operative to releasably contact the engagement ledge 53 of the pocket 47, as described above. The outer surface 97 of the shank portion 91 includes at least one datum rib 101 formed thereon. The at least one datum rib 101 extends from a first end 103 positioned proximate the rear surface 87 of the door member 83 to a second end 105 ending at the curved portion 93 of the hook member 89. In one aspect of the invention, the at least one datum rib 101 includes two datum ribs 101, as shown in FIG. 3. In one aspect of the invention, the hook member 89 may include datum ribs 101, or may have a smooth outer surface 97, as shown in FIG. 3A. Again referring to FIG. 3, the datum rib 101 includes an angled surface 107 formed on the second end 105 of the datum rib 101. The angled surface 107 guides the hook member 89 into the latch slot 63 formed in the box member 17, as well as into the pocket 47 when the door member 83 is hinged closed relative to the box member 17. The datum rib 101 also includes a top surface 109 that is operative to align the hook member 89 in the pocket 47 when the door member 83 is hinged closed relative to the box member 17. The datum rib 101 aligns the door member 83 to the box member 17 as the top surface 109 of the datum rib 101 contacts the latch opening 63. In one aspect of the invention, the latch member 55 is integrally formed with the door member 83. It should be realized that the latch member 55 may otherwise be connected to the door member 83 such as using friction welds or other attachment techniques.

Figure 11:
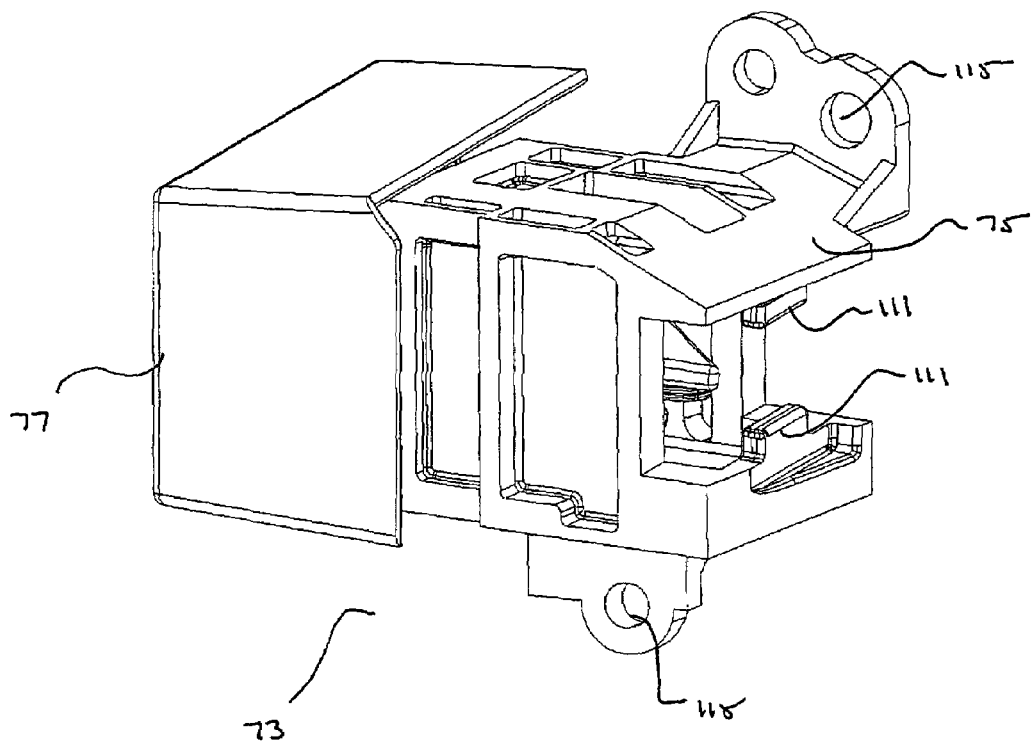
FIG. 11 is a perspective view of a lock assembly according to the present invention.
Figures 12, 13, 14:
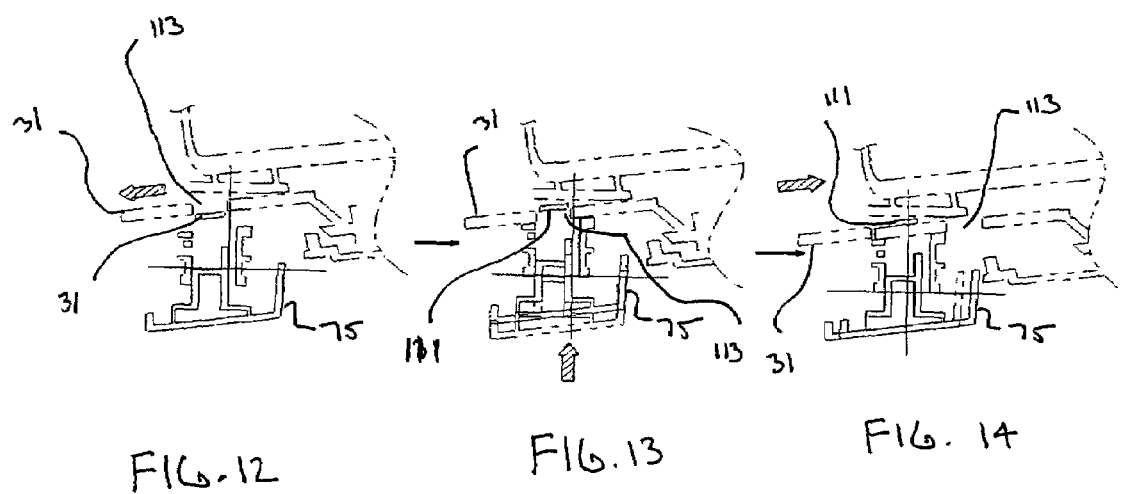
FIG. 12 is a sectional view of the lock assembly being installed to the glove box assembly.
FIG. 13 is a sectional view of the lock assembly being installed to the glove box assembly
FIG. 14 is a sectional view of the lock assembly being installed to the glove box assembly.

Referring to FIG. 11, there is shown the lock assembly 73 of the present invention. As can be seen in the figure, the housing 75 includes location tabs 111 formed thereon. The location tabs 111 pass through key slots 113 formed on the release portion 43 of the slide member 31 when the lock assembly 73 is installed. As best seen in FIG. 12, the lock assembly 73 is positioned to pass through the lock slot 71 formed in the box member 17. The slide member may be moved to the left, as seen in FIG. 12, to align the location tabs 111 with the key slots 113 formed in the slide member 31. Next the lock assembly 73 is pushed forward, as seen in FIG. 13, such that the location tabs 111 pass through the key slots 113 formed in the slide member 31. Next the slide member 31 is moved to the right, as seen in FIG. 14, such that the lock housing 75 is associated with the slide member 31. The release portion 43 of the slide member is positioned between the tabs 111 formed on the lock housing 75. The lock housing 75 may then be attached to the box member 17 using appropriate fasteners positioned through attachment slots 115 formed on the lock housing 75. The extension portion 79 of the lock assembly 73 is now positioned in the lock slot 71 to contact the slide member 31, as described above.

The movement of the slide member 31 left is limited such that the tabs 111 formed on the housing 75 will not pass through the key slots 113 of the slide member 31 once the lock assembly 73 is installed. The size of the angled surface 81 formed on the lock member 77 limits the leftward travel of the slide member 31. In this manner the lock assembly 73 may be attached in a straightforward manner without the need for a complicated assembly process.

In operation, the door member 83 that is hingedly attached to the box member 17 may be moved to a closed position such that the hook members 89 are guided by the ribs 101 formed on the hook members 89 through the latch slots 63 formed in the box member 17 and into the pocket 47 formed in the slide member 31. The slide member 31 is biased by the return spring 69 such that the engagement ledge 53 formed on the slide member 31 contacts the flat contact portion 99 of the hook member 89, as best shown in FIG. 6. In this position, the latch member 55 is securely retained from movement away from the slide member 31 due to the contact, described above.

When one wishes to unlatch or open the glove box assembly 15, an operator depresses the lock member 77 from its initial locked position shown in FIG. 4, where the extension portion 79 does not contact the release portion 43 of the slide member 31, to the unlocked position shown in FIG. 5. In the unlocked position, an operator depresses the lock member 77, such that the lock member 77 moves in relative to the box member 17, such that the extension portion 79 including the angled surface 81 contacts the release portion 43 of the slide member 31. The angled surface 81 contact causes the slide member 31 to move lateral relative to the guide surface 23 of the box member 17. The lateral movement of the slide member 31, best shown in FIG. 7, releases contact between the engagement ledge 53 and the latch member 55 such that the latch member 55 is free to move out with respect to the pockets 47.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A glove box assembly for a vehicle comprising:
   a box member adapted to fit in an opening in the vehicle, the box member including front and rear surfaces, the rear surface including a guide surface formed thereon, the box member including a recessed portion extending toward the direction of the rear surface defining a storage space;
   a pair of tabs spaced laterally relative to each other, each of the tabs extending downward from the recessed portion and rearward of the guide surface;
   a slide member extending from a first end to a second end and including front and rear surfaces, the front surface of the slide member disposed proximate the guide surface, the slide member operative to move laterally relative to the guide surface;
   the slide member including a tapered portion sized to pass without interference with the pair of tabs when the slide member is positioned in an installation position.

2. The glove box assembly of claim 1 wherein the slide member is moved laterally from the installation position to the installed position wherein the pair of tabs retains the slide member in position proximate the guide surface.

3. The glove box assembly of claim 2 wherein the slide member includes a release portion formed on the first end and extending toward the second end of the slide member and an engaging portion extending from the release portion to the second end of the release member.

4. The glove box assembly of claim 2 wherein the engagement portion includes a pair of pockets formed therein, the pockets including a rear surface and side surfaces extending forward from the rear surface.

5. The glove box assembly of claim 4 wherein the pockets include an engagement ledge extending laterally from one of the side surfaces, the ledge operative to releasably engage a latch member in response to lateral movement of the slide member.

6. The glove box assembly of claim 5 wherein the guide surface includes slots formed therein allowing passage of the latch members into the pair of pockets.

7. The glove box assembly of claim 4 wherein the pockets include flexible fingers formed on the rear surface of the pockets.

8. The glove box assembly of claim 7 wherein the flexible fingers extend laterally relative to the rear surface and terminate at bulbous ends extending rearward.

9. The glove box assembly of claim 8 wherein the front surface of the slide member includes rounded projections formed thereon and extending forward from the front surface.

10. The glove box assembly of claim 9 wherein the bulbous ends contact the pair of tabs biasing the slide member forward such that the rounded projections contact the guide surface for reducing noise vibration and rattle between the slide member and the box member.

11. The glove box assembly of claim 2 wherein the guide surface includes a projection member formed thereon, the projection received in a recess formed in the slide member limiting the lateral travel of the slide member relative to the guide surface.

12. The glove box assembly of claim 2 including a return spring attached to the second end of the slide member for biasing the slide member laterally.

13. The glove box assembly of claim 2 including a lock slot formed in the box member proximate the release portion of the slide member.

14. The glove box assembly of claim 13 including a lock assembly having a housing and a lock member movably disposed in the housing for in and out movement relative to the housing, the lock member including an extension portion passing through the lock slot formed in the box member.

15. The glove box assembly of claim 14 including a biasing spring associated with the lock member and housing for biasing the lock member out relative to the housing.

16. The glove box assembly of claim 14 wherein the extension portion includes an angled surface formed on the end of the extension portion.

17. The glove box assembly of claim 16 wherein the angled surface is operative to contact the release portion of the slide member for translating in and out motion of the lock member to lateral movement of the slide member.

18. A glove box assembly for a vehicle comprising:
   a box member adapted to fit in an opening in the vehicle, the box member including front and rear surfaces, the rear surface including a guide surface formed thereon, the box member including a recessed portion extending toward the direction of the rear surface defining a storage space, the guide surface including latch slots formed therein;
   a door member hingedly attached to the box member, the door member including two latch members formed thereon, the latch members movable in the latch slots formed in the box member;
   a pair of tabs spaced laterally relative to each other, each of the tabs extending downward from the recessed portion and rearward of the guide surface;
   a slide member extending from a first end to a second end and including front and rear surfaces, the front surface of the slide member disposed proximate the guide surface, the slide member operative to move laterally relative to the guide surface;

the slide member including a pair of pockets formed therein, the pockets including a rear surface and side surfaces extending forward from the rear surface and an engagement ledge extending laterally from one of the side surfaces, the ledge operative to releasably engage the latch members formed on the door member in response to lateral movement of the slide member.

19. The glove box assembly of claim 18 including a lock assembly mounted on the box member, the lock assembly having a housing and a lock member movably disposed in the housing for in and out movement relative to the housing, the lock member including an extension portion passing through a lock slot formed in the box member.

20. The glove box assembly of claim 19 wherein the extension portion includes an angled surface formed on the end of the extension portion, the angled surface being operative to contact the slide member translating in and out motion of the lock member to lateral movement of the slide member disengaging and engaging the slide member from the latch members of the door member.

21. The glove box assembly of claim 19 wherein the lock housing includes location tabs formed thereon that pass through keyway slots formed on the slide member when the lock assembly is mounted on the box member.

22. The glove box assembly of claim 21 wherein the lock housing is movable with respect to the slide member after the location tabs pass through the keyway slots formed on the slide member for associating the lock housing with the slide member.

* * * * *